I. SILVER.
WINDOW SHADE.
APPLICATION FILED MAY 3, 1915.
1,183,684.
Patented May 16, 1916.
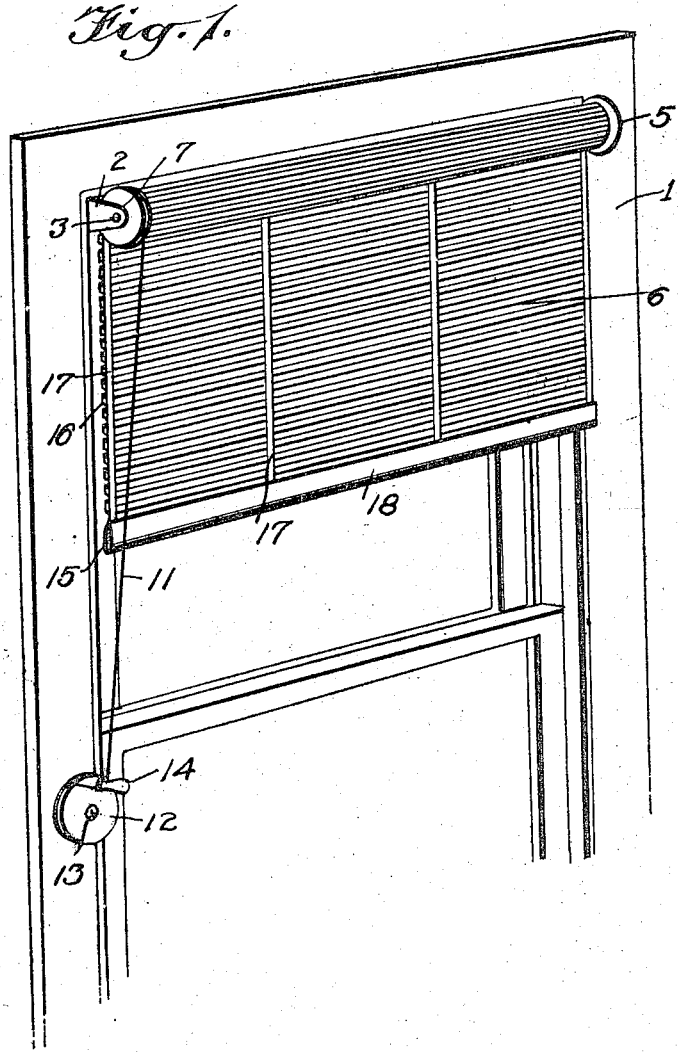
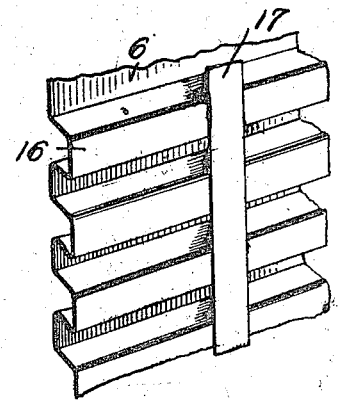
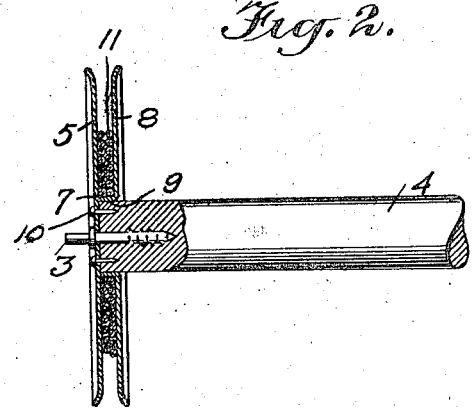
WITNESSES:
INVENTOR
Israel Silver.
BY
ATTORNEY

UNITED STATES PATENT OFFICE.

ISRAEL SILVER, OF NEW YORK, N. Y., ASSIGNOR OF ONE-HALF TO BARNETT MALIS, OF NEW YORK, N. Y.

WINDOW-SHADE.

1,183,684.  Specification of Letters Patent.  Patented May 16, 1916.

Application filed May 3, 1915. Serial No. 25,431.

*To all whom it may concern:*

Be it known that I, ISRAEL SILVER, a subject of the Emperor of Austria-Hungary, and a resident of the city of New York, borough of Manhattan, in the county and State of New York, have invented a new and Improved Window-Shade, of which the following is a full, clear, and exact description.

This invention relates to shades and rollers therefor, and has for an object an improved form of shade arranged with the entire body or part thereof plaited or fluted so as to present an ornamental appearance.

Another object in view is to provide an improved arrangement of roller and mechanism for moving the same, whereby the shade may be raised and lowered and held in any position without operating the shade directly.

In the accompanying drawings:—Figure 1 is a perspective view of a shade and roller and associated parts providing the invention, the same being shown applied; Fig. 2 is a detail view partly in section disclosing a form of pulley or drum embodying certain features of the invention; Fig. 3 is an enlarged detail fragmentary perspective view of part of the shade shown in Fig. 1.

Referring to the accompanying drawings by numerals, 1 indicates the window frame which may be of any desired type, to which suitable brackets 2 are secured for receiving the pintles 3 of the roller 4. The apertures in the brackets 2 are preferably merely round holes for receiving a round pintle or shaft which is preferably connected to the roller 4, as shown in Fig. 2, by being driven therein. The roller 4 has arranged at both ends thereof a plate 5 which at one end acts as means for holding the shade 6 in place and at the other as part of a drum or pulley 7. The drum 7 is formed not only with the disk or plate 5 but with a disk 8 having a tubular turned-in portion 9 which may be secured to the roller 4 in any desired manner. The disks or plates 5 are secured to roller 4 in any suitable manner, as for instance by having securing nails or tacks 10 passed therethrough and into the roller 4.

One end of the cable 11 is secured to a hub or inwardly turned flange 9 of plate 8, while the opposite end is connected in a similar manner to a drum 12 constructed similar to the drum 7. Drum 12 is mounted upon a suitable journal 13 driven into or secured in any desired way to the frame 1. A handle 14 is arranged on drum 12 so that when the same is rotated the cable will be wound thereon. When the shade 6 is completely wound on roller 4 there are preferably one or two coils of the cable 11 in drum 7 while drum 12 is completely full. When drum 12 is rotated so as to become unwound drum 5 will wind the cable 11 thereon in proportion to the downward or unwinding movement of the shade 6.

Shade 6 is provided with a comparatively heavy weight 15 at the lower edge so as to act as a pulling member when drum 12 is released, whereby the shade will readily move downwardly under the action of gravity. In order to hold the drum 12 against movement when shade 6 has been adjusted, cable 11 is given a hitch over member 14 or is looped thereover in any desired manner.

In forming a particular structure of the shade 6 the same is pressed so as to provide plaits or flutes 16, as more clearly shown in Fig. 3, which are held against collapsing by a plurality of retaining strips 17 secured to the outer edges of the flutes or corrugations 16 by any suitable means, as for instance a good quality of adhesive matter. Any desired number of strips 17 may be used, as for instance four as disclosed in Fig. 1. When four are being used there is preferably arranged one on each edge of the shade and the other two are spaced evenly in the body of the shade. The various strips 17 are connected with the tubular member 18 in any suitable manner, as for instance by stitching, so that these strips act as supports for the tubular member and the weight 15 arranged therein, this relieving the flutes or corrugations 16 from any strain. It will be observed that the flutes or corrugations 16 extend transversely of the shade 6 and are provided from the top to the bottom of the shade, but it will be evident that these corrugations or flutes could be rearranged and positioned in groups or at angles to each other, as may be preferred, without departing from the spirit of the invention.

What I claim is:—

1. In a shade of the character described, a body provided with a plurality of corrugations or plaits, said corrugations or plaits being rectangular in cross section so as to present flat surfaces, and a flexible strip rigidly secured to one flat surface of each corrugation.

2. In a shade of the class described, a body formed with corrugations or flutes therein, a plurality of strips extending longitudinally of the body and substantially transversely of the corrugations or flutes, said strips being rigidly secured to one face of each of the corrugations or flutes, a transversely arranged tubular member secured to the lower end of said strips, and a weight arranged in said tubular member, said weight being supported by said strips.

In testimony whereof I have signed my name to this specification in the presence of two subscribing witnesses.

ISRAEL SILVER.

Witnesses:
 MORRIS GRUMET,
 MOLLIE SILVER.